United States Patent Office 3,326,659
Patented June 20, 1967

3,326,659
METHOD FOR REGULATING THE GROWTH OF PLANTS
Herbert Schwartz, Smaragdplein 186, Utrecht, Netherlands
No Drawing. Filed Nov. 24, 1964, Ser. No. 413,630
15 Claims. (Cl. 71—2.3)

This application is a continuation-in-part application of my copending application Ser. No. 174,716, filed Feb. 21, 1962, now abandoned.

The invention relates to novel compositions for regulating the growth of plants comprised of at least one amic acid ester of the formula

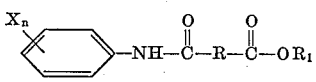

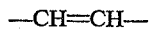

wherein R is selected from the group consisting of —$CH_2$—$CH_2$— and the cis and trans form of

—CH=CH—

$R_1$ is selected from the group consisting of lower alkyl of 1 to 7 carbon atoms, hydroxy lower alkyl, cyano lower alkyl and halo lower alkyl, X is selected from the group consisting of halogen and lower alkyl of 1 to 7 carbon atoms and $n$ is an integer from 1 to 5 with the proviso that when $n$ is 1, X is not para to the nitrogen and when $n$ is 2, the X's are not para to each other and a major amount of an inert carrier. The invention also relates to a novel method for regulating the growth of plants.

Of the various maleamic acids described in the literature, none of them has ever been reported to have phytocidal activity. Lower alkyl esters of N-naphthylmaleamic acid are shown in U.S. Patent No. 2,663,665 to possess fungicidal activity but with no evidence of toxicity to plants or inhibition of the plant's functions or the seed's germination. In U.S. Patent No. 2,885,319 esters of maleanilic acid were stated to be fungitoxic but not phytotoxic and may be used in fungicidal agricultural application. In U.S. Patent No. 2,779,704 esters of various substituted maleanilic acids such as methyl esters of N-(p-chlorophenyl)maleamic acid and N-(2,5-dichlorophenyl)maleamic acid are useful fungicides lacking in phytotoxicity as shown by their direct application to plants.

The prior art discloses that many amic acids and their derivatives, such as N-naphthylphthalamic acid, are phytotoxic. Mentzer et al. (Bull. Soc. Chim. Biol., vol. 32, 1950, p. 572–82) showed that N-naphthylmaleamic and succinic acids had no toxic effect similar to other amic acids Therefore, it was surprising to discover that the novel compounds of Formula I are effective herbicides.

It is an object of the invention to provide novel compositions for regulating the growth of plants in which the active ingredient is an N-(substituted phenyl)amic acid ester of Formula I.

It is another object of the invention to provide a novel method of regulating the growth of plants.

These and other objects and advantages of the invention will become obvious from the following detailed description.

The novel compositions of the invention for regulating the growth of plants are comprised of at least one amic acid ester of the formula:

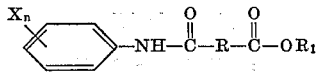

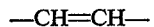

wherein R is selected from the group consisting of —$CH_2$—$CH_2$— and the cis and trans form of

—CH=CH—

$R_1$ is selected from the group consisting of lower alkyl of 1 to 7 carbon atoms, hydroxy lower alkyl, cyano lower alkyl and halo lower alkyl, X is selected from the group consisting of halogen and lower alkyl of 1 to 7 carbon atoms and $n$ is an integer from 1 to 5 with the proviso that when $n$ is 1, X is not para to the nitrogen and when $n$ is 2, the X's are not para to each other and a major amount of an inert carrier. X may be fluorine, chlorine, bromine or iodine.

The amic acid esters of Formula I possess plant growth regulating properties. The fumaric acid esters retard the growth of plants while the maleamic acid esters and succinamic acid esters stimulate the germination and growth of certain seeds and are excellent herbicides when applied as post-emergence.

The amic acid esters of Formula I may be applied to the plants in solid form such as a dust in admixture with a powdered solid carrier such as talc, powdered mica, etc. or in liquid form such as in an aqueous emulsion or in any known fashion. The effective amount of the active compounds can vary but is usually effective when applied in a dosage equivalent to 1 to 4 pounds of the amic acid ester per acre.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachlorethane, tri-chlorethylene or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethyleneoxide, or of soya bean fatty acid with 30 molecular proportions of ethyleneoxide or of commercial oleylamine with 15 molecular proportions of ethyleneoxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum-sulfonic acid. As cation-active dispersing agents there may be used quaternary ammonium compounds, such as cetyl-pyridinium bromide or di-(hydroxyethyl)-benzyl-dodecyl-ammonium chloride.

For making dusting or scattering preparations there may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances there may be mentioned fatty acids, resins, glue, casein or, for example, alginates or the like.

In the following examples there are described several preferred embodiments to illustrate the invention. However, it should be understood that the invention is not intended to be limited to the specific embodiments.

*Example I.—Preparation of alkyl maleanilates*

The alkyl maleanilates of Formula I were prepared according to the process described and claimed in my copending United States application Ser. No. 174,694, filed Feb. 21, 1962, now U.S. Patent No. 3,228,972 by reacting the free acid with the proper alcohol in the presence of a dehydrating agent selected from the group consisting of concentrated sulfuric acid and phosphorous pentoxide. The following compounds were prepared in this fashion:

TABLE I

| Compound | Melting Point, °C. | Percent Nitrogen | |
|---|---|---|---|
| | | Calculated | Found |
| Methyl N-(3,4-dichlorophenyl)maleamate | 114 | 5.11 | 5.07 |
| Methyl N-(2-chloro-6-methylphenyl)maleamate | 122.5 | 5.52 | 5.60 |
| Methyl N-(2,4-dichlorophenyl)maleamate | 67-67.5 | 5.11 | 5.12 |
| Methyl N-(3-chlorophenyl)maleamate | 66.5-67.5 | 5.85 | 5.41 |
| Ethyl N-(3,4-dichlorophenyl)maleamate | 80-82 | 4.86 | 5.10 |
| Ethyl N-(2-chloro-6-methylphenyl)maleamate | 105-106.5 | 5.23 | 5.18 |
| Propyl N-(2-chloro-6-methylpehenyl)maleamate | 78-79 | 4.98 | 5.18 |
| Butyl N-(2-chloro-6-methylphenyl)maleamate | (1) | | |
| Ethyl N-(2,4-dichlorophenyl)maleamate | 40-42 | 4.86 | 4.78 |
| Methyl N-(2-chlorophenyl)maleamate | 88.5-90.5 | 5.85 | 6.01 |
| Methyl N-(3-chloro-4-methylphenyl)maleamate | 102.5-105.5 | 5.52 | 5.61 |
| Ethyl N-(2,3-dichlorophenyl)maleamate | 91.5-92 | 4.86 | 4.95 |
| Methyl N-(2-methyl-4-chlorophenyl)maleamate | 107 | 5.52 | 5.56 |
| Ethyl N-(2-methyl-4-chlorophenyl)maleamate | 80-82 | 5.23 | 5.29 |
| Methyl N-(2,3-dichlorophenyl)maleamate | 115-117 | 5.11 | 5.20 |
| Methyl N-(3-chlorophenyl)succinamate | 93-94 | 5.80 | 5.86 |
| Methyl N-(2-methyl-3-chlorophenyl)maleamate | 107-108 | 5.52 | 5.82 |
| Ethyl N-(2-methyl-3-chlorophenyl)maleamate | 104-105 | 5.23 | 5.23 |
| Methyl N-(2,6-dichlorophenyl)maleamate | 132 | 5.11 | 5.16 |
| Ethyl N-(2,6-dichlorophenyl)maleamate | 128 | 4.86 | 5.07 |
| Methyl N-(2,4-dimethylphenyl)maleamate | 103 | | |
| β-hydroxyethyl N-(3,4-dichlorophenyl)maleamate | 123-125 | 4.60 | 4.12 |
| β-cyanoethyl N-(2,4-dichlorophenyl)maleamate | (2) | | |
| Propyl N-(3,4-dichlorophenyl)maleamate | 63-64 | 4.64 | 4.93 |
| Butyl N-(3,4-dichlorophenyl)maleamate | (2) | | |
| Propyl N-(2,4-dichlorophenyl)maleamate | (2) | | |
| Butyl N-(2,4-dichlorophenyl)maleamate | (2) | | |
| Methyl N-(2,4-dichlorophenyl)succinamate | 98.5-99.5 | 5.08 | 5.16 |
| Methyl N-(3,4-dichlorophenyl)succinamate | 121-122 | 5.08 | 5.33 |
| Methyl N-(3,4-dichlorophenyl)fumaramate | 186 | 5.11 | 4.89 |
| Methyl N-(2,4,6-trichlorophenyl)maleamate | 138.5 | 4.54 | 4.69 |
| Ethyl N-(3,4-dichlorophenyl)succinamate | 120-121 | 4.83 | 4.77 |
| Ethyl N-(2,4-dichlorophenyl)succinamate | 82.5-83 | 4.83 | 4.85 |

1 Greaselike at room temperature.
2 Liquid at room temperature (viscous).

Other esters such as propyl and butyl N-(2-methyl-4-chlorophenyl)maleamates, both crystalline solids, and β-chloroethyl and β-bromoethyl N-(2-,4-dichlorophenyl) maleamates, both viscous liquids, are also useful plant growth regulators within the scope of the invention.

The following examples demonstrate the herbicidal activity of some of the compounds of the invention as compared with a few of the prior art compounds. The phytotoxicity ratings used in the examples are obtained in Table II.

TABLE II

Ratings: Percent foliage burn
0 ——————————————————— No phytotoxicity
1 ——————————————————— Trace
2 ——————————————————— 15
3 ——————————————————— 25
4 ——————————————————— 40
5 ——————————————————— 50
6 ——————————————————— 65
7 ——————————————————— 75
8 ——————————————————— 85
9 ——————————————————— 95
10 ——————————————————— 100

*Example II*

A concentration of the compounds to be tested consisted of 10% of the test compound, 10% of Triton X-161 and 80% of Espesol-5 (xylenes). The concentrates were emulsified with water to prepare emulsions having a concentration of 0.2% by weight of the test compounds. The emulsions were applied to various crops at a rate of 2 pounds per acre and the phytotoxicities of the compounds were determined. The results are summarized in Table III.

TABLE III

| Crop | Methyl N-3,4-dichlorophenyl)-maleamate | Methyl N-2,4-dichlorophenyl)-maleamate | Methyl N-2,5-dichlorophenyl)-maleamate |
|---|---|---|---|
| Beets | 6 | 10 | 0 |
| Rye Grass | 2 | 7 | 0 |
| Oats | 7 | 10 | 0 |
| Wheat | 7 | 9 | 0 |
| Peas | 2 | 5 | 0 |
| Cucumbers | 4 | 10 | 0 |
| Beans | 1 | 1 | 0 |
| Cotton | 2 | 1 | 0 |
| Crabgrass | 2 | 5 | 0 |

As can be seen from the table the prior art ester, methyl N-(2,5-dichlorophenyl)maleamate, does not have any phytotoxicity while the novel isomers are good herbicides.

*Example III*

Esters were also applied as a 0.2% kerosene solution at a rate of 1 pound per acre and the following phytotoxicities were determined.

TABLE IV

| Crop | Methyl N-(3-chlorophenyl)-maleamate | Methyl N-(4-chlorophenyl)-maleamate | Methyl N-(4-bromophenyl)-maleamate |
|---|---|---|---|
| Wheat | 8 | 1 | 0 |
| Oats | 8 | 1 | 0 |
| Rye Grass | 10 | 3 | 0 |
| Tomato | 2 | 5 | 3 |
| Radish | 2 | 1 | 0 |
| Flax | 9 | 2 | 0 |

A concentrate of the test compounds consisted of 10% of the test compound, 10% of Triton X-161 and 80% of Espesol-5 (xylenes). The concentrates were emulsified with water to prepare emulsions having a concentration of 0.2% by weight of the test compounds. The emulsions were applied to various crops at a rate of two pounds of test compound per acre and the phytotoxicities were determined. The results are summarized in Table V.

TABLE V

| Crop | Methyl N-(2-chlorophenyl)-maleamate | Methyl N-(3-chlorophenyl)-maleamate | Methyl N-(4-chlorophenyl)-maleamate |
|---|---|---|---|
| Wheat | 3 | 6 | 1 |
| Oats | 2 | 8 | 1 |
| Tomato | 0 | 2 | 1 |
| Radish | 8 | 4 | 6 |
| Beets | 1 | 2 | 0 |

As can be seen from Tables IV and V when the halogen atom is para to the amide grouping the herbicidal activity is unsatisfactory but if the halogen is meta or ortho to the amide grouping the herbicidal activity is good.

Example IV

A concentrate consisting of 10% of ethyl N-(3,4-dichlorophenyl)maleamate, 10% of Triton X-161 and 80% of Pent-Oxol (Glycol ether) was emulsified with water so that the emulsion contained 0.2% by weight of the said maleamate. The emulsion was sprayed on pots containing cotton and crabgrass seedlings. In the control pots the crabgrass grew luxuriantly and stole nutrients from the cotton whose growth was stunted. In the sprayed pots the crabgrass ceased all growth permanently but did not die while the cotton grew and developed normally. Ethyl N-(3,4-dichlorophenyl)maleamate acts as an inhibitor or growth suppressor only for the crabgrass and this selective effect makes it ideal for the control of crabgrass in cotton fields.

Example V

A wettable powder consisting of equal parts of a mixture consisting of 92% of HiSil 233 (extremely fine hydrated silica pigment), 4% of Marasperse N (lignosulfonates) and 4% of Pluronic L 61 (condensation product of polypropylene glycol and ethylene oxide) and methyl N-(3,4-dichlorophenyl)-maleamate was diluted with water to form an emulsion containing 0.4% by weight of said maleamate. Three plots of seedling cotton were sprayed with the emulsion at a dosage of 4 pounds per acre and three similar plots were used as controls. About ten days to two weeks after the application crabgrass appeared in the control plots only.

Example VI

By substituting Espesol-5 for Pent-Oxol in the concentrate of Example IV, ethyl N-(3,4-dichlorophenyl)-maleamate also inhibited the growth of rye grass. When using Velsicol AR 50G for the Pent-Oxol of Example IV, rye grass is completely killed.

Example VII

A 10% solution of methyl N-(2,4-dichlorophenyl)-maleamate in white oil was dissolved in refined kerosene so that the solution had a 0.2% concentration of said maleamate. The solution was applied to pots containing crabgrass and cotton at a dose of 1 pound per acre. The crabgrass was completely killed while the cotton was substantially undamaged.

Example VIII

Ethyl N-(2,4-dichlorophenyl)maleamate was formulated as in Example II and was applied to pots containing wheat and wild oats. The wild oats wilted and died while the wheat continued to thrive. Wild oats are pests in wheat, barley, sugar beets, peas and many other crops. The said ester is also non-toxic to beets.

Example IX

Aqueous acetone solutions of methyl N-(3,4-dichlorophenyl)maleamate and 2,4-dichlorophenoxyacetic acid (a standard herbicide) were applied to pots containing pig weed and snap beans at a rate of 4 pounds per acre. Pigweed is a pest in legume fields. Both the weeds and snap beans sprayed with 2,4-dichlorophenoxyacetic acid died while in the pots sprayed with the said maleamate the pigweed died and the snap beans were totally unaffected.

Example X

A composition (A) containing 10% of methyl N-(2,4-dichlorophenyl)succinamate, 10% of Triton X-161 and 80% of Velsicol AR 50G was suspended in sufficient water to form an aqueous emulsion containing 0.2% of the said succinamate. The said emulsion was applied to a number of different plants at a dosage of 3 pounds per acre.

A composition (B) containing 10% of methyl N-(2,4-dichlorophenyl)succinamate, 10% of Triton X-161, 10% of Velsicol AR 50G and 70% of butyl carbitol acetate was dissolved in sufficient kerosene to form a solution containing 0.2% of the said succinamate. The said solution was applied to different plants at a dosage of 1.5 pounds per acre. The results are summarized in Table VI.

TABLE VI

| Crops | Composition A | Composition B |
|---|---|---|
| Beet | 0 | 1 |
| Tomato | 9 | 10 |
| Radish | 9 | 10 |
| Flax | 8 | 10 |
| Rye Grass | 2 | 10 |
| Oat | 9 | 10 |
| Wheat | 3 | 10 |
| Bean | 1 | 6 |
| Cotton | 0 | 7 |
| Crabgrass | 0 | 4 |

As can be seen from Table VI methyl N-(2,4-dichlorophenyl)succinamate is useful for controlling the growth of wild oats in sugar beet fields.

Example XI

Methyl N-(3,4-dichlorophenyl)succinate was used in place of methyl N-(2,4-dichlorophenyl)succinamate in compositions A and B of Example X. Both compositions were diluted with sufficient water to form aqueous emulsion containing 0.2% of the said succinamate and were applied to various crops at a dosage of 3 pounds per acre. The results are summarized in Table VII.

TABLE VII

| Crops | Composition A | Composition B |
|---|---|---|
| Beet | 1 | 0 |
| Tomato | 9 | 5 |
| Radish | 8 | 8 |
| Flax | 8 | 8 |
| Rye Grass | 1 | 3 |
| Oat | 6 | 1 |
| Wheat | 4 | 0 |
| Bean | 0 | 0 |
| Cotton | 0 | 0 |

It can be seen from Table VII that methyl N-(3,4-dichlorophenyl)succinamate is useful for controlling broadleaf weeds in cotton for which 2,4-dichlorophenoxyacetic acid and its derivatives are too toxic to cotton.

Tests with methyl N-(3,4-dichlorophenyl)fumaramate showed that the compound retarded the growth of tomato plants to one-sixteenth their normal size. Methyl N-(3,4-dichlorophenyl)succinamate and methyl N-(3,4-dichlorophenyl)maleamate stimulated germination and growth of rye grass and beet seeds. Methyl N-(2,4-dichlorophenyl)succinamate and methyl N-(2,4-dichlorophenyl)maleamate inhibited the germination of flax and tomato seeds but stimulated the germination and growth of beet seeds.

*Example XII*

To demonstrate the desiccant and defoliant activity of the compounds of the invention, various compounds were prepared as 10% emulsion concentrates in Solvent F and 9 ml. of the concentrate were diluted with water to make a 100 ml. final spraying solution. The said solution was sprayed on bean plants having four well developed true leaves and eight week old cotton at a dosage rate of about two pounds of active ingredient per acre. The percent of desiccation and the percent of defoliant were determined and added to obtain the total activity and the data is presented in Table VIII.

2. The method of claim 1 wherein the amic acid ester is methyl N-(3,4-dichlorophenyl)maleamate.
3. The method of claim 1 wherein the amic acid ester is methyl N-(2,4-dichlorophenyl)maleamate.
4. The method of claim 1 wherein the amic acid ester is ethyl N-(3,4-dichlorophenyl)maleamate.
5. The method of claim 1 wherein the amic acid ester is ethyl N-(2,4-dichlorophenyl)maleamate.
6. The method of claim 1 wherein the amic acid ester is propyl N-(2-chloro-6-methylphenyl)maleamate.
7. The method of claim 1 wherein the amic acid ester is butyl N-(2-chloro-6-methylphenyl)maleamate.
8. The method of claim 1 wherein the amic acid ester is methyl N-(2-methyl-4-chlorophenyl)maleamate.
9. The method of claim 1 wherein the amic acid ester is methyl N-(2,4-dichlorophenyl)succinamate.
10. The method of claim 1 wherein the amic acid ester is ethyl N-(2,4-dichlorophenyl)succinamate.
11. The method of claim 1 wherein the amic acid ester is methyl N-(3,4-dichlorophenyl)succinamate.
12. The method of claim 1 wherein the compound is a lower alkyl ester of N-(3,4-dichlorophenyl)maleamic acid.
13. The method of claim 1 wherein the compound is a lower alkyl ester of N-(2,4-dichlorophenyl)maleamic acid.

TABLE VIII

| Compound | Cotton | | | Beans | | |
|---|---|---|---|---|---|---|
| | Percent Desc. | Percent Def. | Total Amount | Percent Desc. | Percent Def. | Total Amount |
| Methyl N-(2-chloro-6-methylphenyl) maleamate: | | | | | | |
| 1 | 10 | 20 | 30 | 30 | 50 | 80 |
| 2 | 20 | 30 | 50 | 10 | 70 | 80 |
| 3 | 20 | 20 | 40 | | | |
| Methyl N-(3,4-dichlorophenyl)maleamate: | | | | | | |
| 1 | 25 | 30 | 55 | 20 | 0 | 20 |
| 2 | 60 | 0 | 60 | 30 | 50 | 80 |
| Methyl N-(2-methyl-3-chlorophenyl) maleamate: | | | | | | |
| 1 | 20 | 20 | 40 | 100 | 0 | 100 |
| 2 | 40 | 50 | 90 | 80 | 20 | 100 |
| 3 | 20 | 50 | 70 | | | |
| Ethyl N-(2-methyl-3-chlorophenyl) maleamate: | | | | | | |
| 1 | | | | 70 | 30 | 100 |
| 2 | | | | 20 | 70 | 90 |
| 3 | | | | | | |

Various modifications of the method and products of the invention may be made without departing from the spirit or scope thereof, and it is to be understood that the invention is to be limited only as defined in the appended claims.

I claim:
1. A method for regulating the growth of plants which comprises applying to the said plants a plant growth regulating amount of at least one compound of the formula

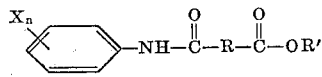

wherein R is selected from the group consisting of —CH$_2$CH$_2$— and the cis and trans form of —CH═CH—, R$_1$ is selected from the group consisting of substituted lower alkyl and lower alkyl having 1 to 7 carbon atoms, X is selected from the group consisting of halogen and lower alkyl and n is an integer from 1 to 5 with the proviso that when n is 1, X is not para to the nitrogen and when n is 2, the X's are not para to each other.

14. The method of claim 1 wherein the compound is a lower alkyl ester of N-(2-methyl-4-chlorophenyl)maleamic acid.
15. The method of claim 1 wherein the compound is a lower alkyl ester of N-(2,4-dichlorophenyl)succinamic acid.

References Cited

UNITED STATES PATENTS

| | | | |
|---|---|---|---|
| 2,723,991 | 11/1955 | Sears et al. | 260—518 |
| 2,779,704 | 1/1957 | Ligett et al. | 260—471 |
| 2,863,864 | 12/1958 | Kirchner | 260—518 |
| 3,228,972 | 1/1966 | Schwartz | 71—2.6 X |

FOREIGN PATENTS 807,257  1/1959  Great Britain.

OTHER REFERENCES

Chemical Abstracts, volume 55, column 1540b (1961).
Chemical Abstracts, volume 11, column 1400 (1917).

LEWIS GOTTS, *Primary Examiner.*

J. O. THOMAS, JR., *Assistant Examiner.*